United States Patent Office 2,788,338
Patented Apr. 9, 1957

2,788,338

UREA TYPE RUBBER ANTI-EXPOSURE CRACKING AGENTS

Richard O. Zerbe, Nitro, W. Va., assignor to Monsanto Chemical Company, St. Louis, Mo., a corporation of Delaware No Drawing. Application February 9, 1953, Serial No. 335,999

18 Claims. (Cl. 260—45.9)

This invention relates to new anti-exposure cracking agents for sulfur-vulcanizable rubbers and to rubber vulcanizates containing same.

One of the major problems of the rubber industry is the protection of vulcanizates of sulfur-vulcanizable rubbers against exposure cracking, that is degradation of the vulcanizate due to ozone while under static or dynamic stress. The problem is a serious one, particularly with respect to the service life of rubber tires, and is aggravated by the fact that in general chemical antioxidants have little or no value in protecting vulcanizates against deterioration by ozone. Although many and varied substances have been suggested and tried, not one has been found entirely satisfactory. Accordingly rubber technologists have constantly sought improvements.

In accordance with this invention it has been found that compounds comprising the nucleus

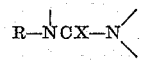

where R is an alkoxy aryl group and X is oxygen or sulfur are effective against exposure cracking. Preferred are urea compounds containing the radical

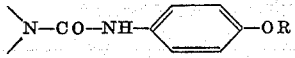

where R is a hydrocarbon radical such as methyl, ethyl, propyl, isopropyl, allyl, butyl, isobutyl, sec. butyl, isoamyl, hexyl, octyl, dodecyl, cyclohexyl, benzyl, phenethyl, hexahydrobenzyl, phenyl, tolyl, xylyl, cumyl, naphthyl, etc. Compounds having the alkoxy group in positions other than the para position are highly effective anti-exposure cracking agents for sulfur-vulcanizable rubber vulcanizates providing either that one or two hydrocarbon groups containing in total at least ten carbon atoms are attached to the other nitrogen atom or a p-alkoxy aryl group.

One very effective group of anti-exposure cracking agents possesses the general formula

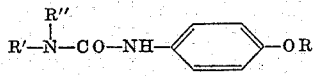

where R' is hydrogen, an aromatic hydrocarbon radical, a dialkyl amino phenyl radical, cyclohexyl or an alkoxy phenyl radical, where R" represents hydrogen or a hydrocarbon group and where R is an alkyl radical. Examples of R' are phenyl, p-anisyl, o-anisyl, p-phenetyl, p-butoxy phenyl, p-amoxy phenyl, p-dimethylamino phenyl, p-diethylamino phenyl, p-dibutylamino phenyl, cyclohexyl, naphthyl, indanyl, etc., and R is preferably a short chain alkyl group, namely methyl, ethyl, propyl, butyl or amyl. Some of the alkoxy aryl ureas are very resistant to discoloration. Outstanding in this respect are dicyclohexyl alkoxy phenyl ureas and 2,4'-diethoxy carbanilide. Where two cyclohexyl groups are present the position of the alkoxy group apparently is not significant. As illustrative of the anti-exposure cracking agents of this invention are 1-phenyl-3-(p-anisyl)urea
1-phenyl-3-(p-phenetyl)urea
1-phenyl-3-(p-n-propoxy phenyl)urea
1-phenyl-3-(p-isopropoxy phenyl)urea
1-phenyl-3-(p-isobutyroxy phenyl)urea
1-(1-naphthyl)-3-(p-anisyl)urea
1-(1-naphthyl)-3-(p-phenetyl)urea
1-(2-naphthyl)-3-(p-phenetyl)urea
1-(3-indanyl)-3-(p-phenetyl)urea Other urea compounds exhibiting effective anti-exposure cracking properties in sulfur-vulcanizable rubber vulcanizates are 1-cyclopentyl-3-(p-phenetyl)urea
1-cyclohexyl-3-(p-anisyl)urea
1-cyclohexyl-3-(p-phenetyl)urea
1-cyclohexyl-3-(p-isobutyroxy phenyl)urea
1-p-tolyl-3-(p-anisyl)urea
1-p-tolyl-3-(p-phenetyl)urea
1-m-tolyl-3-(p-phenetyl)urea
1-p-tert-butyl phenyl-3-(p-phenetyl)urea
1-(3,5-xylyl)-3-(p-phenetyl)urea
1,3-bis(p-anisyl)urea
1,3-bis(p-phenetyl)urea
1,3-bis(p-isopropoxy phenyl)urea
1,3-bis(p-isobutyroxy phenyl)urea
1-phenyl-3-(p-phenoxy phenyl)urea
1-(1-naphthyl)-3-(p-phenoxy phenyl)urea
1-(1-tetrahydronaphthyl)-3-(p-phenetyl)urea As illustrative of the anti-exposure cracking properties of the urea compounds of this invention natural rubber compositions are prepared utilizing the following ingredients:

| Stock | A | B |
|---|---|---|
| Smoked sheets rubber _____ parts by weight__ | 100 | 100 |
| Carbon black _____do____ | 50 | 50 |
| Saturated hydrocarbon softener _____do____ | 3 | 3 |
| Zinc oxide _____do____ | 5 | 5 |
| Stearic acid _____do____ | 3 | 3 |
| Sulfur _____do____ | 2.5 | 2.5 |
| N-Cyclohexyl-2-benzothiazole sulfenamide_____do____ | 0.8 | 0.8 |
| Anti-exposure cracking agent _____do____ | ____ | 1.5 |

The ingredients are admixed on a rubber mill in the customary fashion and the respective compounded stocks are cured in a press at 142° C. for 30 minutes. Since evaluation under static conditions is not indicative of the service obtained with many types of rubber articles which must withstand flexing, the vulcanized compositions are evaluated under dynamic conditions in an atmosphere containing a definite concentration of ozone. Samples of the stocks are cured in the form of a belt ½" wide, ¼" thick and 5⅝₆" diameter and mounted on 1" diameter shafts. The ozone concentration is maintained at 20–30 parts per hundred million throughout the test and the shafts are rotated at 75 R. P. M. In this manner a momentary elongation through a range of 0–20% is provided at any portion of the test specimen passing over the shaft. (The apparatus and procedure employed is described in a paper of Creed et al. entitled "An Apparatus for the Evaluation of Ozone Protective Agents for Elastomers Under Dynamic Conditions" given at the Cincinnati, Ohio, meeting of the Rubber Division of the American Chemical Society May 1, 1952.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

*Table I*

| Anti-Exposure Cracking Agent | Surface Cracking After Flexing in Ozone for— | | | |
|---|---|---|---|---|
| | 8 Hrs. | 24 Hrs. | 48 Hrs. | 56 Hrs. |
| None (Stock A) | none | slight | moderate | severe |
| 1-(1-Naphthyl)-3-(p-phenetyl) urea (Stock B) | do | none | slight | slight |

The new compounds of this invention are particularly useful in the control of exposure cracking of the sulfur-vulcanizable synthetic rubber-like materials prepared by the polymerization of a conjugated diene compound, either alone or with other unsaturated compounds co-polymerizable therewith. The synthetic rubbers which may be substantially improved in ozone resistance are polymers of the aliphatic conjugated diene compounds such as butadiene, isoprene, piperylene, dimethyl butadiene, ethyl butadiene, and the like either alone or with unsaturated monoolefinic compounds which contain the $CH_2=C<$ group such as the vinyl aromatics, namely styrene, α-methyl styrene, nuclear substituted styrenes, monochlorstyrene, dichlorstyrene, divinyl benzene, vinyl naphthalene, vinyl biphenyl, vinyl carbazole, 2-vinyl-5-ethyl pyridine, etc., and such vinyl compounds as acrylonitrile methacrylonitrile, acrylic acid, methacrylic acid and esters thereof, methyl vinyl ketone, and the like.

As illustrative of the control of exposure cracking of vulcanized sulfur-vulcanizable synthetic rubber-like materials, a rubbery butadiene-1,3-styrene copolymer composition is prepared utilizing the following ingredients:

| Stock | C | D | E |
|---|---|---|---|
| GR-S 100 parts by weight | 100 | 100 | 100 |
| Carbon black do | 50 | 50 | 50 |
| Saturated hydrocarbon softener do | 10 | 10 | 10 |
| Zinc oxide do | 4 | 4 | 4 |
| Stearic acid do | 2 | 2 | 2 |
| Sulfur do | 1.75 | 1.75 | 1.75 |
| N-Cyclohexyl-2-benzothiazole sulfenamide do | 1.2 | 1.2 | 1.2 |
| Anti-exposure cracking agent do | | 1.5 | 3.0 |

The ingredients are admixed on a rubber mill in the customary fashion and the respective compounded stocks are cured in a press at 144° C. for 30 minutes. The vulcanizates are then evaluated for cracking resistance as aforedescribed. In the table below are typical results with 3.0 parts of the protective agent. It will be appreciated that the difference between the figures obtained with the base stocks (C) is due to the fact that the stocks were prepared and evaluated on different occasions. However, the respective conditions of the base stock provides proper comparison in each instance.

In Table III the resistance of stock D (1.5 parts of anti-cracking agent) to exposure cracking is illustrated. The value recorded is the ratio of the cracking resistance to that of an untreated control (stock C) ran at the same time. This is a very convenient method of summarizing the relative utility of a large number of materials. The data were obtained by assigning a numerical rating as a measure of the degree of cracking and plotting these units on the vertical axis against the time of exposure. The numbers employed and the corresponding descriptions were as follows:

1. No cracking
2. Very slight cracking
3. Slight cracking
4. Moderate cracking
5. Severe cracking
6. Very severe cracking A set of stocks answering this description was used as a standard and each stock was compared to this standard so as to assign a comparable numerical rating. The six degrees of cracking were designated on the vertical axis in reverse order, in other words beginning with six nearest the horizontal axis and ending with one at the top. Plotting the numerical ratings against exposure time in this manner gave a curve which approached the horizontal axis as the cracking progressed. Obviously, the greater the area under the curve the greater the degree of protection. Observations were made at intervals, usually after 8, 24, 48, 72 and 96 hours. The areas under the curve were then measured with a planimeter and the area divided by the area for a similar stock run at the same time without any anti-flex cracking agent. The resulting figure is the ratio of the protection as compared to the untreated stock as 100. This value is designated as protection ratio.

*Table III*

| Anti-Exposure Cracking Agent | Protection Ratio |
|---|---|
| Di-p-phenetyl urea | 228 |
| 4-Ethoxycarbanilide | 244 |
| 1-(1-Naphthyl)-3-(p-phenetyl)urea | 222 |
| 1,1-Dicyclohexyl-3-(p-phenetyl)urea | 296 |
| 4-Ethoxy-4'-dimethylaminocarbanilide | 300 |
| 1-Cyclohexyl-3-(p-phenetyl)urea | 290 |
| 4-Ethoxy-4'-methylcarbanilide | 316 |
| 4-Ethoxy-2'-methylcarbanilide | 310 |
| 2-Ethoxycarbanilide | 126 |
| 1,1-Dicyclohexyl-3-(o-phenetyl)urea | 302 |
| 2,4'-Diethoxycarbanilide | 270 |
| 1-(2-Naphthyl)-3-(o-phenetyl)urea | 254 |
| 4-Ethoxy-2'-phenylcarbanilide | 284 |
| 1-(2-Naphthyl)-3-(p-phenetyl)urea | 271 |

As further illustrative of rubber-like compositions exhibiting improved resistance to exposure cracking are sulfur-vulcanizable stocks comprising such synthetic rubbers as the rubbery copolymers of butadiene-1,3 and acrylonitrile (e. g. Hycar OR–15) and the rubber-like polymers

*Table II*

| Anti-Exposure Cracking Agent | Surface Cracking After Flexing in Ozone for— | | | | |
|---|---|---|---|---|---|
| | 16 Hrs. | 24 Hrs. | 30 Hrs. | 48 Hrs. | 102 Hrs. |
| None (Stock C) | moderate | extremely severe | | | |
| p-Phenetyl urea (Stock E) | none | none | none | very slight | very slight |
| None (Stock C) | | very slight | | moderate | |
| 4-Ethoxy thiocarbanilide (Stock E) | | none | | none | | of isobutylene with small amounts of diolefins such as isoprene (e. g. butyl rubber), specific examples being

| Stock | F | G |
|---|---|---|
| Butadiene-acrylonitrile rubber_____parts by weight__ | 100 | ------ |
| Isobutylene-isoprene rubber_____do____ | ------ | 100 |
| Carbon black_____do____ | 60 | 54 |
| Zinc oxide_____do____ | 4 | 4 |
| Stearic acid_____do____ | 1 | 1 |
| Sulfur_____do____ | 1.5 | 0.75 |
| 2,2'-Dithiobis benzothiazole_____do____ | 1.5 | 1.0 |
| Tetra ethyl thiuram disulfide_____do____ | ------ | 1.5 |
| Lead oxide_____do____ | ------ | 5.0 |
| 1-Phenyl-3-(p-phenetyl)urea_____do____ | 2.0 | 2.0 |

Although the advantage of the alkoxy aryl ureas as anti-exposure cracking agents is much more pronounced in synthetic butadiene copolymers than in natural rubber, the resistance to discoloration is evaluated more conveniently in natural rubber stocks. For example stocks were compounded comprising

| Stock | H | J |
|---|---|---|
| Pale crepe rubber_____parts by weight__ | 100 | 100 |
| Zinc oxide_____do____ | 60 | 60 |
| Lithopone_____do____ | 20 | 20 |
| Sulfur_____do____ | 2 | 2 |
| Diphenylguanidine phthalate_____do____ | 0.825 | 0.825 |
| 2-Benzothiazyl thiol benzoate_____do____ | 0.675 | 0.675 |
| Paraffin_____do____ | 0.25 | 0.25 |
| Anti-exposure cracking agent_____do____ | ------ | 1.5 |

The stocks were vulcanized for 60 minutes at 126° C. Samples of the cured stocks were then exposed under an S-1 sunlamp for various intervals. After exposure the light reflected from the surface of the stocks was measured by means of a Photovolt Reflectance Meter calibrated against reflectance of standard MgO as 100%. An untreated control is run at the same time and comparing the stock containing the anti-exposure cracking agent to the untreated control shows whether or not the anti-exposure cracking agent causes discoloration.

Table IV

| Anti-Exposure Cracking Agent | Stock | Light Reflectance, Percent | | |
|---|---|---|---|---|
| | | Unexposed | After exposure to sunlamp | |
| | | | 24 Hours | 10 Days |
| None_____ | H | 73 | 73 | 69 |
| Di-p-phenetyl urea_____ | J | 73 | 70 | 68 |
| None_____ | H | 76 | 76 | 76 |
| 1-(1-Naphthyl)-3-(p-phenetyl)urea___ | J | 75 | 75 | 71 |

These results show that the anti-exposure cracking agents cause no significant discoloration of the stock under the conditions of the test. However, it was found that curing the stocks at higher temperatures did result in some discoloration. Nevertheless, other alkoxy aryl ureas were found which did not discolor even at high curing temperatures. For example test stocks were compounded comprising

| Stock | K | L |
|---|---|---|
| Pale crepe rubber_____parts by weight__ | 100 | 100 |
| Stearic acid_____do____ | 1 | 1 |
| Protox 166 Zinc oxide_____do____ | 25 | 25 |
| Rayox_____do____ | 50 | 50 |
| Suprex clay_____do____ | 15 | 15 |
| 2,2'-Dithiobis benzothiazole_____do____ | 0.5 | 0.5 |
| Diphenylguanidine_____do____ | 0.15 | 0.15 |
| Sulfur_____do____ | 3 | 3 |
| Anti-exposure cracking agent_____do____ | ------ | 1.5 |

The stocks were cured in the usual manner by heating in a press for 60 minutes at 142° C. and the resistance to discoloration evaluated as described above:

Table V

| Anti-Exposure Cracking Agent | Stock | Light Reflectance, Percent | | |
|---|---|---|---|---|
| | | Unexposed | After exposure to sunlamp | |
| | | | 24 Hours | 10 Days |
| None_____ | K | 80 | 74 | 61 |
| 1,1-Dicyclohexyl-3-(p-phenetyl)urea__ | L | 75 | 64 | 61 |
| None_____ | K | 79 | 73 | 62 |
| 1,1-Dicyclohexyl-3-(o-phenetyl)urea__ | L | 80 | 77 | 72 |
| 2,4'-Diethoxycarbanilide_____ | L | 81 | 73 | 62 |

It is obvious from the foregoing that the new compounds of this invention are a class of compounds which substantially increase the life of natural and synthetic rubber goods. The new anti-exposure cracking agents disperse readily and rapidly in rubber stocks, both natural and synthetic. As illustrated either urea or thiourea derivatives may be used although as a class the thioureas are much less effective.

Smaller amounts of the urea compounds of this invention may be employed than those indicated in the foregoing examples. Amounts as small as 0.2% by weight on the rubber (natural and synthetic) of the urea compounds of this invention exhibit significant anti-exposure cracking properties. Amounts higher than those specifically shown, as for example up to 5% by weight on the rubber, may be employed depending upon the nature of the urea compound as well as that of the rubber, the other compounding ingredients used and the objectives of the compounder.

By the terms "vulcanized rubber" and "sulfur-vulcanizable rubber" as employed in the appended claims, unless otherwise modified, is meant natural as well as synthetic rubbers which are capable of vulcanization when heated with sulfur and includes latices and reclaims of such materials.

It is to be understood that other desired filling and compounding ingredients may be incorporated in the rubber base along with the anti-exposure cracking agent. For example, there may be incorporated other accelerators, softeners, etc. as well as the customary rubber antioxidants.

While the invention has been described with respect to certain specific embodiments it is not so limited and it is to be understood the variations and modifications thereof obvious to those skilled in the art may be made without departing from the spirit or scope of this invention.

What is claimed is:

1. A sulfur-vulcanizable hydrocarbon rubber vulcanizate said rubber being selected from a group consisting of natural rubber and a synthetic copolymer of a major proportion of a butadiene-1,3 hydrocarbon and a minor proportion of a vinyl aromatic monomer copolymerizable therewith containing an alkoxy aryl compound of the structure

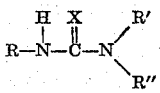

where R is an alkoxy aryl group and X is an element of group VI of atomic weight less than 50, R' is selected from a group consisting of hydrogen, aromatic hydrocarbon, cyclohexyl and alkoxy phenyl radicals and R'' is selected from a group consisting of hydrogen and hydrocarbon.

2. A sulfur-vulcanizable hydrocarbon rubber vulcanizate said rubber being selected from a group consisting of natural rubber and a synthetic copolymer of a major proportion of a butadiene-1,3 hydrocarbon and a minor proportion of a vinyl aromatic monomer copolymerizable therewith containing a compound of the structure

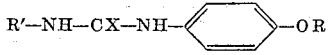

where R is an alkyl radical of less than 5 carbon atoms, X is an element of group VI of atomic weight less than 50 and R' is a hydrocarbon radical.

3. A sulfur-vulcanizable hydrocarbon rubber vulcanizate said rubber being selected from a group consisting of natural rubber and a synthetic copolymer of a major proportion of a butadiene-1,3 hydrocarbon and a minor proportion of a vinyl aromatic monomer copolymerizable therewith containing a urea compound of the formula

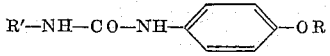

where R' is an aromatic hydrocarbon radical of not more than 12 carbon atoms and where R is an alkyl radical of less than 5 carbon atoms.

4. A vulcanized butadiene-styrene rubber composition said rubber being a sulfur vulcanizable copolymer of a major proportion of butadiene-1,3 and a minor proportion of styrene containing a urea compound of the formula

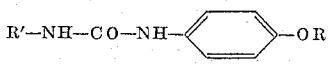

where R' is an aromatic hydrocarbon radical and where R is an alkyl radical of less than 3 carbon atoms.

5. A sulfur-vulcanizable hydrocarbon rubber composition said rubber being selected from a group consisting of natural rubber and a synthetic copolymer of a major proportion of a butadiene-1,3 hydrocarbon and a minor proportion of a vinyl aromatic monomer copolymerizable therewith containing a urea compound of the formula

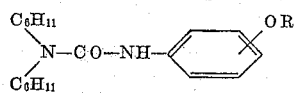

where R is a short chain alkyl radical containing less than 5 carbon atoms.

6. A vulcanized hydrocarbon rubber composition containing a urea compound of the formula

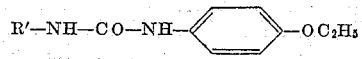

where R' is an aromatic hydrocarbon radical of less than 13 carbon atoms, said rubber being a sulfur-vulcanizable copolymer of a major proportion of a butadiene-1,3 hydrocarbon and a minor proportion of a vinyl aromatic monomer copolymerizable therewith.

7. A vulcanized hydrocarbon rubber composition containing 1,1-dicyclohexyl-3-(p-phenetyl)urea, said rubber being a sulfur vulcanizable copolymer of a major proportion of butadiene-1,3 and a minor proportion of styrene.

8. A vulcanized hydrocarbon rubber composition containing 1-(1-naphthyl)-3-(p-phenetyl)urea, said rubber being a butadiene-styrene copolymer sulfur vulcanizable copolymer of a major proportion of butadiene-1,3 and a minor proportion of styrene.

9. A vulcanized hydrocarbon rubber composition containing 1,3-bis(p-phenetyl)urea, said rubber being a butadiene-styrene copolymer sulfur vulcanizable copolymer of a major proportion of butadiene-1,3 and a minor proportion of styrene.

10. A vulcanized hydrocarbon rubber composition containing 1,1-dicyclohexyl-3-(o-phenetyl)urea, said rubber being a butadiene-styrene copolymer sulfur vulcanizable copolymer of a major proportion of butadiene-1,3 and a minor proportion of styrene.

11. A vulcanized hydrocarbon rubber composition containing 2,4'-diethoxycarbanilide, said rubber being a butadiene-styrene copolymer sulfur vulcanizable copolymer of a major proportion of butadiene-1,3 and a minor proportion of styrene.

12. A vulcanized hydrocarbon rubber composition containing a urea compound of the formula

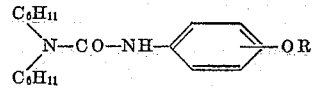

where R is an alkyl radical of less than 5 carbon atoms, said rubber being a sulfur-vulcanizable copolymer of a major proportion of a butadiene-1,3 hydrocarbon and a minor proportion of a vinyl aromatic monomer copolymerizable therewith.

13. A vulcanized hydrocarbon rubber composition containing a urea compound of the formula

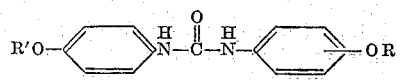

where R and R' are alkyl groups of less than 5 carbon atoms, said rubber being a sulfur-vulcanizable copolymer of a major proportion of a butadiene-1,3 hydrocarbon and a minor proportion of a vinyl aromatic monomer copolymerizable therewith.

14. The process of improving the resistance to exposure cracking of a sulfur vulcanizable hydrocarbon rubber said rubber being selected from a group consisting of natural rubber and a synthetic copolymer of a major proportion of a butadiene-1,3 hydrocarbon and a minor proportion of a vinyl aromatic monomer copolymerizable therewith which comprises incorporating therein a compound of the structure

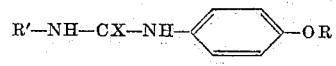

where R is an alkyl radical of less than 5 carbon atoms, X is an element of Group VI of atomic weight less than 50 and R' is a hydrocarbon radical.

15. The process of improving the resistance to exposure cracking of a vulcanizable hydrocarbon rubber composition which comprises incorporating therein a urea compound of the formula

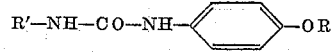

where R' is an aromatic hydrocarbon radical of less than 13 carbon atoms and where R is a short chain alkyl radical of less than 3 carbon atoms, said rubber being a sulfur-vulcanizable copolymer of a major proportion of a butadiene-1,3 hydrocarbon and a minor proportion of a vinyl aromatic monomer copolymerizable therewith.

16. The process of improving the resistance to exposure cracking of a vulcanizable hydrocarbon rubber composition which comprises incorporating therein a urea compound of the formula

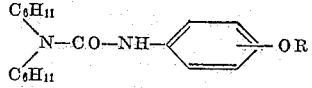

where R is an alkyl radical of less than 5 carbon atoms, said rubber being a sulfur-vulcanizable copolymer of a major proportion of a butadiene-1,3 hydrocarbon and a minor proportion of a vinyl aromatic monomer copolymerizable therewith.

17. The process of improving the resistance to exposure cracking of a vulcanizable hydrocarbon rubber composition which comprises incorporating therein a urea compound of the formula

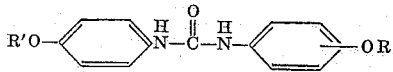

where R and R' are alkyl groups of less than 5 carbon atoms, said rubber being a sulfur-vulcanizable copolymer of a major proportion of a butadiene-1,3 hydrocarbon and a minor proportion of a vinyl aromatic monomer copolymerizable therewith.

18. The process of improving the resistance to exposure cracking of a sulfur vulcanizable copolymer of a major proportion of butadiene-1,3 and a minor proportion of styrene which comprises incorporating therein 1,1-dicyclohexyl-3-(o-phenetyl)urea.

References Cited in the file of this patent

UNITED STATES PATENTS

| | | |
|---|---|---|
| 2,555,167 | Van Dijk et al. | May 29, 1951 |
| 2,583,370 | Goppel et al. | Jan. 22, 1952 |
| 2,654,722 | Young et al. | Oct. 6, 1953 |

FOREIGN PATENTS

| | | |
|---|---|---|
| 571,662 | Great Britain | Sept. 7, 1945 |